United States Patent [19]

Dumestre, III

[11] Patent Number: 5,136,613
[45] Date of Patent: Aug. 4, 1992

[54] SPREAD SPECTRUM TELEMETRY

[76] Inventor: Alex C. Dumestre, III, 21 S. Lakeshore Dr., Covington, La. 70433

[21] Appl. No.: 590,406

[22] Filed: Sep. 28, 1990

[51] Int. Cl.$^5$ ............................................. H01K 1/00
[52] U.S. Cl. .......................................... 375/1; 367/76
[58] Field of Search ...................... 367/76, 77, 78, 79, 367/80, 2, 6, 117, 134; 375/1

[56] References Cited

U.S. PATENT DOCUMENTS

| | | |
|---|---|---|
| 3,289,152 | 11/1966 | McIlwraith et al. |
| 3,551,889 | 12/1970 | Miller |
| 4,121,198 | 10/1978 | Tsuboi et al. |
| 4,318,126 | 3/1982 | Sassler |
| 4,463,452 | 7/1984 | Chase, Jr. |
| 4,594,727 | 6/1986 | Pierce |
| 4,606,049 | 8/1986 | Daniel |
| 4,660,215 | 4/1987 | Horiike et al. |
| 4,809,299 | 2/1989 | Ho |
| 4,860,307 | 8/1989 | Nakayama |

Primary Examiner—Thomas H. Tarcza
Assistant Examiner—David Cain
Attorney, Agent, or Firm—Pravel, Gambrell, Hewitt, Kimball & Krieger

[57] ABSTRACT

Transponders in or with a shallow water seismic cable emit acoustic signals for acoustic ranging on command from a transceiver aboard a seismic exploration vessel. The acoustic ranging data together with navigational data cna be used to identify cable location. The transponders are activated by individual identifying digital codes. Each such digital code is a data word of suitable length composed of a distinctive frequency sent in bursts for a specific time for successive pairs of bits, or di-bits, in the data word. The time spacing between sending the frequency bursts is also used to carry other di-bits of the data word.

16 Claims, 2 Drawing Sheets

SPREAD SPECTRUM TELEMETRY

BACKGROUND OF INVENTION

1. Field of Invention

The present invention relates to an active sonar tracking system providing cable location information for shallow water seismic data acquisition.

2. Description of the Prior Art

During seismic exploration of formations beneath relatively shallow bodies of water, acoustic ranges can be very short. Further, the transponders on the seismic cable and the transceiver on the seismic vessel must operate in an environment of high reverberation and multipath signals. Both phenomena are severely destructive of both acoustic signal amplitude and phase.

Large gradients in the speed of sound velocity profile, caused by water surface temperature and salinity, tend to drastically limit acoustic range. Shadow or dead zones are caused as the acoustic rays bend downwardly to the bottom of the body of water and then are reflected upwards toward the water surface. Acceptable positioning can, however, be achieved when range data is available on at least a fifty to sixty percent basis. For this reason, it is desirable to receive range signals from multiple transponder locations as the source vessel travels along its line of profile.

SUMMARY OF INVENTION

Briefly, the present invention provides a new and improved telemetry apparatus, including a transceiver which transmits and receives signals to a plurality of addressable transponders in a seismic cable. The transceiver forms a code which is transmitted to the transponders. The code is in the form of digital bits of a data word composed of a distinctive frequency for such bits. Preferably, the digital bits of the data word are in the form of successive pairs, or di-bits, to reduce baud rate. Further, the digital bits can be separated by distinctive time spacings, representing additional data bits. This use of time spacing as an additional data or information carrier also serves to overcome destructive amplitude and phase effects of multipath signals and reverberation in shallow water seismic data acquisition.

DESCRIPTION OF PREFERRED EMBODIMENT

Figure 1:
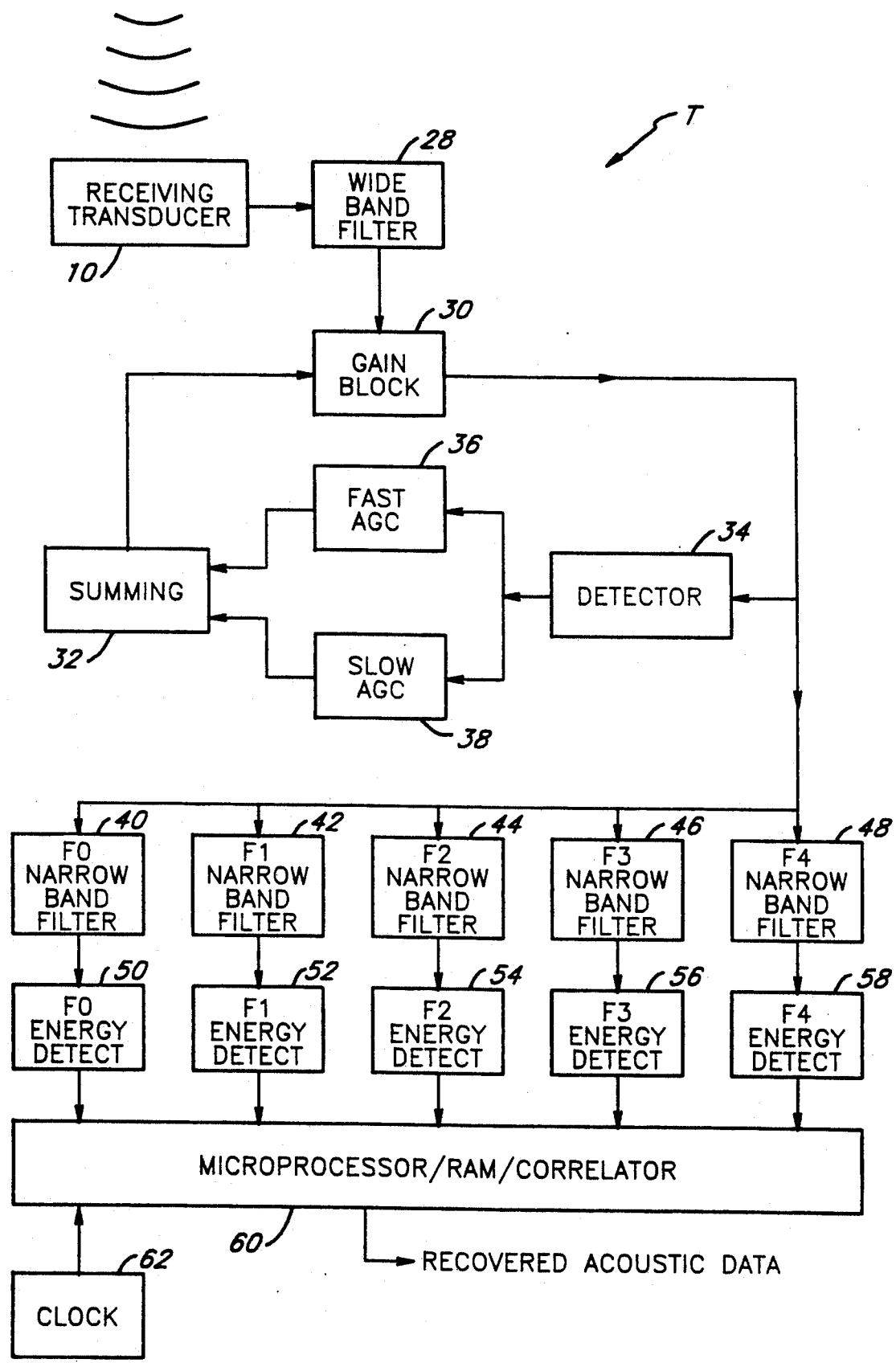
FIG. 1 is a schematic diagram of a transmitter for a telemetry system according to the present invention.

In the drawings a spread spectrum acoustic telemetry apparatus according to the present invention is set forth. The spread spectrum acoustic telemetry apparatus includes a transceiver T (FIG. 1) transported in a marine seismic exploration vessel and a suitable number of receivers or transponders R (FIG. 2) deployed in or with a conventional seismic cable deployed along a line of seismic profile in a relatively shallow body of water.

The transceiver T and the transponders R of the spread spectrum acoustic telemetry apparatus in accordance with the present invention use two spread spectrum techniques, frequency hopping and time hopping. This provides very high noise immunity and reduced transmitting power.

Figure 3:
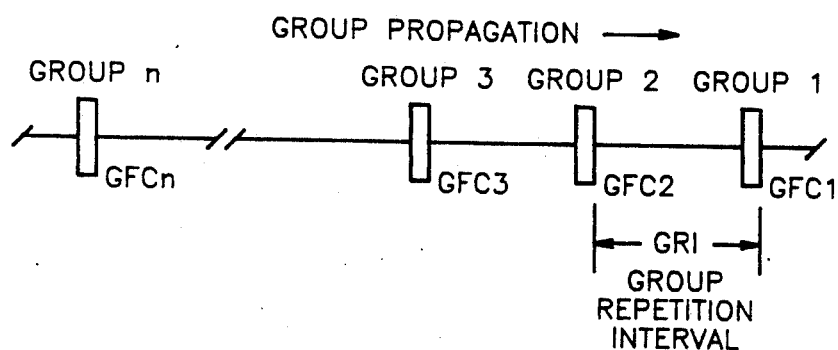
FIGS. 3 and 4 are exemplary signal waveform diagrams in a telemetry system according to the present invention.

Turning now to FIG. 3, a representative waveform diagram according to the spread spectrum technique of the present invention is set forth. The frequency hopping in accordance with the present invention is used to transmit digital information as one data channel. Time hopping is also provided to improve the noise immunity and provide other additional data channels. A minimum of three frequencies are preferably used for transmission of binary modulated data. A faster and more preferred, efficient method is to use di-bit, or bit pairs, rather than binary modulation. In the di-bit technique, a total of at least five frequencies are needed.

These five frequencies, are designated as $f_0$, $f_1$, $f_2$, $f_3$, and $f_4$. The frequency $f_0$ serves as a synchronization frequency, while the remaining four frequencies are data code frequencies indicative of the data content of the particular di-bit pairs in the data code word.

Di-bit modulation according to the present invention allows two bits of data to be encoded at one time as a frequency hopping code. This di-bit modulation increases the baud rate by a factor of two over a conventional binary modulation scheme where only one bit is encoded at a time. Other bit encoding modulation schemes can be employed at the expense of additional frequencies and band width.

Since address data is to be sent over an acoustic telemetry link in the apparatus of the present invention, time hopping techniques to be disclosed below are also preferably employed to overcome the destructive amplitude and phase effects of multipath signals and reverberation in the shallow body of water in which seismic exploration is being performed. A further benefit afforded by time hopping according to the present invention is to utilize the time domain or time spacing between the frequency bursts of the data code frequencies as a supplemental information carrier. This makes additional data channels possible.

Since additional data is encoded by altering the time interval between the data frequency groups, the data will be subject to Doppler effects caused by the relative motion between the transceiver T and the receivers R. This can be corrected according to the present invention by using an encoding scheme which establishes an exact time interval between the synchronization signal at frequency $f_0$ and a first digital data bit of the data stream. The Doppler frequency can easily be measured and the data encoded in the remaining inter-data groups times can be corrected for the Doppler frequency effect. The Doppler frequency measurements are then only needed to be made for the time interval between the synchronization code group $f_0$ and the first data group, or di-bit, pair. The time intervals between the remaining data groups in the incoming stream of data from the transponders R to the transceiver T can thus be utilized as additional data channels in the time hopping or time domain modulation format.

Referring now to FIG. 3, a representative data word transmitted according to the present invention is shown, which can be of any given length. The data word transmitted according to the spread spectrum acoustic telemetry system of the present invention begins with a synchronization group frequency code with an assigned discrete frequency $f_0$, followed by a group repetition interval of a known exact time interval, as has been set forth above. After the expiration of the group repetition interval, di-bit bursts of assigned frequencies follow, depending upon the data content of the data being transmitted from the transponders R to the transceiver T follow. For example, if the data content of the code carried in the group frequency code is a binary code, two discrete frequencies: $f_1$ for a data value of zero, and $f_2$ for a digital one, are used for each bit transmitted in the group.

According to the present invention, the baud rate, the speed at which the data is sent, can be substantially increased if the group frequency codes express the value of two or more bits at the same time. The simplest case to accomplish this are four discrete frequencies, an assigned frequency $f_1$ for a di-bit pair of 00 is used, a second frequency $f_2$ is used for a di-bit pair 01, a third frequency $f_3$ for a di-bit pair 10, and a fourth frequency $f_4$ is used for a di-bit pair 11.

This di-bit pair method of encoding can be expanded to transmit any number of bits at the same time. The number of frequencies y for transmitting additional numbers of bits increases according to a factor of $2^Y$. This, of course, provides practical limits due to frequency band width limitations. However, according to the present invention, a combination of data both in the group frequency code and the group repetition interval can be utilized to shorten the number of groups sent for a particular data word.

Figure 2:
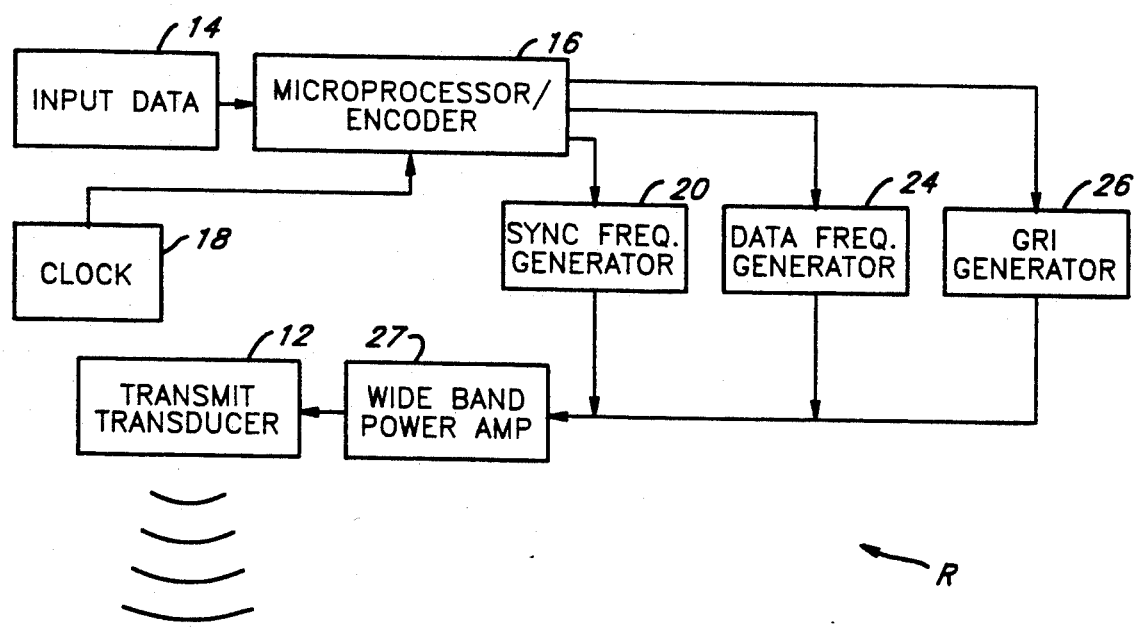
FIG. 2 is a schematic diagram of a receiver for a telemetry system according to the present invention.

In the apparatus of the present invention, an acoustic or mechanical energy wave transducer 10 in the transceiver T (FIG. 1) and a similar transducer 12 in a receiver R (FIG. 2) which communicate on request data obtained during seismic exploration in the receiver R (FIG. 2). The input data is received from one or more hydrophones 14 in the seismic cable are furnished to a microprocessor/encoder 16 which is driven by a master clock 18.

The microprocessor 16 includes a transmit buffer of a suitable number of registers, for example four registers when di-bit modulation is desired. The microprocessor 16 further includes an assignment or look-up table to encode four di-bit frequencies and four group repetition intervals. When requested by the transceiver T to transmit data, the microprocessor 16 first stores in a first of the transmitter buffer registers an indication to initially activate a synchronization frequency generator 20 to send an initial burst 22 at synchronization frequency $f_0$ (FIG. 4) for a predetermined interval of time.

Next, the microprocessor 16 reads in, for a di-bit modulation technique, eight bits of input data from data source 14. The two least significant bits of the input data are masked with the group recognition interval lookup table in a microprocessor 16 by a digital logic AND function. The di-bit lookup table in the microprocessor 16 is then consulted to assign the designated frequency for the data content of these two bits, the value of such designated frequency then being stored in a second of the transmit buffer registers which is used to activate a designated frequency generator 24.

The input data is then shifted to bits, discarding the two least significant bits, and the foregoing process is repeated. The di-bit lookup table value in the microprocessor 16 then obtained is then stored in the third of the transmit buffer register. The foregoing process is then again repeated for the next di-bit pair and the results stored in the fourth of the transmit buffer registers in the microprocessor 16. The designated frequency generator 24 is activated by the third and fourth transmit buffer registers after each such step.

The input data are then shifted, discarding the two least significant bits and the remaining two least significant bits of the input data are then masked by a digital logic AND function with the encoded lookup table in the microprocessor 16 representing the four group repetition intervals. The group repetition interval lookup table in the microprocessor 16 is then consulted and an appropriate time domain or time hopping value for that pair or di-bits of data assigned. A group recognition interval generator 26 is then activated. The foregoing process is continued by shifting the input data from the data source 14, discarding the two least significant bits, pending further coding according to the present invention.

A serial data output sequence is then begun by loading a first timer in the microprocessor/encoder 16 with a time constant so as to generate a transmit frequency contained in a transmit buffer register in the microprocessor 16. Further, a second timer in the microprocessor/encoder 16 is loaded with an encoded group repetition interval. At this time, transmission is begun of a frequency envelope of, for example, one millisecond in length and the second timer in the microprocessor/encoder 16 is started. The completion of the cycle of the second timer in the microprocessor/encoder 16 is completed, signifying the end of the first group repetition interval.

The first two bits of the initial di-bit are then transmitted by loading the first timer in the microprocessor/encoder 16 with a constant which generates the transmit frequency represented by the data in transmit buffer register number two in microprocessor/encoder 16. Further, the second timer in the microprocessor/encoder 16 is then loaded with a suitably encoded group repetition interval time. Again, transmission of a frequency envelope of, for example, one millisecond in length is started while the second timer in the microprocessor/encoder 16 is begun. After the second time interval has been completed, this signifies the end of the second group repetition interval, di-bit number four or bits seven and six of the data stream.

The foregoing process is then repeated for bits three and two or di-bit number two in the data stream, and thereafter for di-bits number three or bits five and four in the data stream.

The transmit transducer 12 receives the signals generated in the foregoing manner from the synchronized frequency generator 20, the data frequency generator 24, and group recognition interval generator 26 through a suitable power amplifier 27 and transmits the encoded signals formed in the manner set forth above to the receiving transducer 10 of the transceiver T.

The signals received by the receiving transducer 10 (FIG. 1) are then passed through an appropriate wide band filter 28 through a gain blocking circuit 30 to a detector 34. The detected signals from the detector 34 pass through a pair of parallel automatic gain control, or AGC, circuits 36 and 38. The outputs of the automatic gain control circuits 36 and 38 are then summed in a summing network 32 and an output signal from the summing network 32 is furnished to the gain blocking circuit 30.

The output of the gain blocking circuit is further furnished and parallel to a set of narrow and filters 40, 42, 44, 46 and 48, each assigned to individually detect one of the signed group frequency codes $f_0$, $f_1$, $f_2$, $f_3$, and $f_4$.

Associated with each of the narrow band filters 40, 42, 44, 46 and 48 is an individually assigned energy detector 50, 52, 54, 56 and 58 to detect the presence of energy, if any, in the band width assigned to such respective narrow band filter. The energy detectors 50, 52, 54, 56 and 58 each provide input signals, when energy in the frequency band assigned thereto is present, to a microprocessor/random access memory/correlator 60 driven by a synchronizing clock 62.

The microprocessor/random access memory/correlator 60 is programmed to allocate a suitable data acquisition time sample, for example, one second. In the random access memory portion of the microprocessor 60, a two dimension data array buffer of, for example, 1,000 bites is allocated. Under control of the clock 62, a master sample interval of, for example, 100 microseconds is established. Further, lookup tables corresponding to those in the microprocessor/encoder 16 are established for both the frequency domain data and the time domain data in the microprocessor/ram/correlator 60.

As signals are received in the microprocessor 60 from the energy detector circuits, data acquisition is begun by starting both the data acquisition time sample and the master clock timer. Further, a pointer or indicator is set in the data buffer array to indicate the beginning of an incoming data array. In the microprocessor 60, the outputs of the energy detectors 50, 52, 54, 56 and 58 are repetitively and sequentially polled to determined the presence of any incoming energy in the band of frequency assigned to the respective detectors.

If there is an indication or a detection of energy in a band from one of the detectors, the present reading of the master clock 62 is stored as a first dimension element of the data buffer array established in the random access memory portion of microprocessor 60. The filter number, whether $f_0$, $f_1$, $f_2$, $f_3$, or $f_4$, where the energy is detected is indicated to be the second dimension element of the two dimension buffer array stored in the random access memory portion of microprocessor 60. Input polling in the foregoing manner is continued to the end of the data acquisition time sample.

On completion of the data acquisition time sample period, the microprocessor 60 is then converted under suitable program control to be used as a replica correlator. The correlator is loaded with the group repetition interval signature to be extracted from the received data and the raw received data is moved a second input into the correlator. The correlator portion of the microprocessor 60 at first attempts to process signal signatures representing group repetition interval one. The buffer pointer established at the beginning of the array is located at the beginning of the data buffer array and the correlator searches the second element of the two dimension data buffer array appearing in the synchronization or $f_0$ portion of the band.

At this time, three other entries must appear as the first dimension element in the data buffer array, separated by the master clock times equal to the group repetition interval.

As the group repetition intervals are matched, the di-bit data is equal to the value stored in the second dimension element of the data buffer array for that time interval. In order for the correlation process to be successful, all three additional entries must be found at the proper group repetition interval.

If the foregoing correlation process is unsuccessful, the next occurrence of the presence of a synchronization pulse and frequency $f_0$ is processed until the data buffer is completely searched.

When the correlation process is successful, then the group repetition interval value is decoded from the lookup table stored in the microprocessor 60 and such value becomes the most significant di-bit value. Processing for additional data is continued at occurrence of the next synchronization pulse $f_0$ until the entire data buffer array is completely searched. The correlated portion of microprocessor 60 is then loaded with the group repetition interval of the next signature to be examined. The foregoing process is then repeated until all four repetition intervals have been processed.

The correlator portion of microprocessor 60 is used to despread or detect the incoming data words. The synchronization group $f_0$ must first be found. A sign-bit correlator or discrete filter can, if desired, be used to identify the synchronization group frequency. With the synchronization group frequency being found, the first group retention interval can then be located as has been described above. This time interval between the synchronization group and the first data group frequency code is the group repetition interval from which any Doppler distortions in the incoming data can be located.

| GROUP FREQUENCY | | | GROUP REPETITION | | |
|---|---|---|---|---|---|
| Code | Content | Frequency | Interval | Content | Time |
| f0 | Sync | 50.00 khz | (0) | "00" | 18.0 ms |
| f1 | "00" | 52.63 khz | (1) | "01" | 20.0 ms |
| f2 | "01" | 55.56 khz | (2) | "10" | 22.0 ms |
| f3 | "10" | 58.82 khz | (3) | "11" | 24.0 ms |
| f4 | "11" | 62.50 khz | | | |

EXAMPLE 1

An eleven bit word using di-bit modulation are sent. The data word includes:

| | |
|---|---|
| 1 | Sync group (1 bit) |
| 3 | Di-bit data groups (6 bits; D0/D1, D2/D3, D4,D5) |
| 1 | Di-bit checksum (2 bits - optional) |
| 1 | Di-bit data Group Repetition Interval (2 bits; D6/D7) |

EXAMPLE 2

Figure 4:
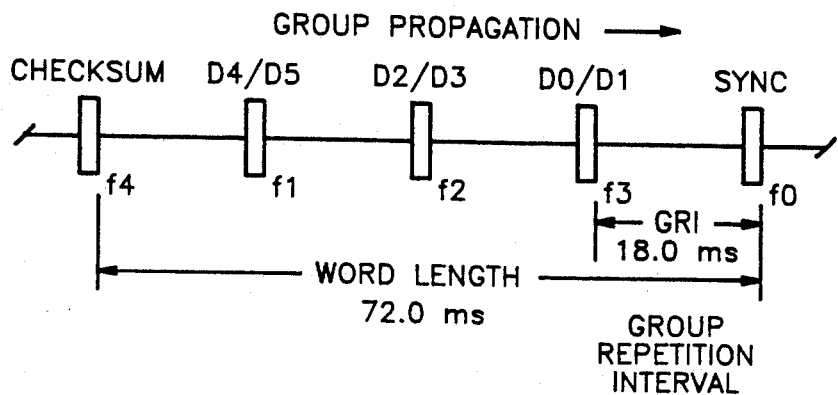

Refer to FIG. 4

In all, five Group Frequency Code groups, four Group Repetition Intervals are transmitted and five frequencies are used. Data will be contained in both the frequency domain in the form of group frequency codes and in the time domain in the form of group repetition intervals. Di-bit modulation is employed. The word components are defined as:

The number "6" is the data to be transmitted. 6=00 00 01 10, in binary.

D6/D7="00", D4/D5="00", D2/D3="01", D1/D0="10"

Checksum Bit=D0/D1 exclusive or D2/D3, exclusive or D4/D5, exclusive or D6/D7

Group 1=Sync
Group 2=Data bits D0/D1 "10"
Group 3=Data bits D2/D3 "01"
Group 4=Data bits D4/D5 "00"

Group 5=Checksum bits {Exclusive or Group (2 to 4), Exclusive or Group Repetition intervals}(optional)

Group Repetition Interval=Data bits D6/D7 "00"

The foregoing are suitable exemplary examples of the group frequency code and the group repetition intervals for spread spectrum acoustic telemetry according to the present invention.

Although the invention has been described with reference to its preferred embodiments, those of ordinary skill in the art may, upon reading understanding this disclosure, appreciate changes and modifications which may be made which do not depart from the scope and spirit of the invention as described above or claimed hereafter.

I claim:

1. A spread spectrum telemetry apparatus, comprising:
    a transceiver for transmitting and receiving signals; a plurality of addressable transponders in a seismic cable;
    means for forming a code of digital bits of a data word for transmission to the addressable transponders;
    said plurality of addressable transponders comprising means responsive to the code transmitted from said transceiver.

2. The apparatus of claim 1, wherein said transceiver comprises:
    means for forming the code of digital bits of the data word composed of a distinctive frequency burst for such bits.

3. The apparatus of claim 1, wherein said transceiver comprises:
    means for forming the code as successive pairs of digital bits of the data word composed of a distinctive frequency burst for each such pair of bits.

4. The apparatus of claim 2, wherein said transceiver comprises:
    means for forming the code of digital bits of the data word composed of a distinctive frequency burst at discrete times for such bits.

5. The apparatus of claim 4, wherein said transceiver comprises:
    means for forming the code of digital bits of the data word composed of a distinctive time spacing between such discrete frequency bursts.

6. The apparatus of claim 2, wherein said plurality of addressable transponders comprise:
    means responsive to the code of digital bits of the data word composed of a distinctive frequency burst for such bits.

7. The apparatus of claim 6, wherein said plurality of addressable transponders comprise:
    means for forming the code as successive pairs of digital bits of the data word composed of a distinctive frequency burst for each such pair of bits.

8. The apparatus of claim 6, wherein said plurality of addressable transponders comprise:
    means for forming the code of digital bits of the data word composed of a distinctive frequency burst at a discrete time for such bits.

9. The apparatus of claim 6, wherein said plurality of addressable transponders comprise:
    means for forming the code of digital bits of the data word composed of a distinctive time spacing between such discrete frequency bursts.

10. A spread spectrum telemetry transmitter, for transmitting signals to a plurality of addressable transponders in a seismic cable, comprising:
    means for forming a code of digital bits of a data word composed of a distinctive frequency burst for such bits for transmission; and
    means for forming a code of further digital bits of the data word composed of a distinctive time spacing between such discrete frequency bursts.

11. The apparatus of claim 10, wherein said transmitter comprises:
    means for forming the code as successive pairs of digital bits of the data word composed of a distinctive frequency burst for each such pair of bits.

12. The apparatus of claim 11, wherein said transmitter comprises:
    means for forming a code of digital bits of the data word composed of a distinctive frequency burst at discrete times for such bits.

13. A spread spectrum telemetry transponder in a seismic cable, comprising:
    means responsive to a code of digital bits of a received data word composed of a distinct frequency burst for such bits; and
    means responsive to a code of digital bits of the received data word composed of a distinctive time spacing between the discrete frequency bursts.

14. The apparatus of claim 13, wherein said transponder comprises:
    means for forming a code of successive pairs of digital bits of a data word for transmission composed of a distinctive frequency for each such pair of bits.

15. The apparatus of claim 13, wherein said transponder comprises:
    means for forming a code of digital bits of the data word for transmission composed of a distinctive frequency burst at discrete times for such bits.

16. The apparatus of claim 13, wherein said plurality of addressable transponders comprise:
    means for forming a code of digital bits of the data word for transmission composed of a distinctive time spacing between such discrete frequency bursts.

* * * * *